(12) United States Patent
Breedvelt-Schouten (10) Patent No.: US 9,240,061 B2
(45) Date of Patent: Jan. 19, 2016

(54) PATTERN REPRESENTATION IMAGES FOR BUSINESS INTELLIGENCE DASHBOARD OBJECTS

(71) Applicant: International Business Machines Corporation, Armonk, NY (US)

(72) Inventor: Ilse M. Breedvelt-Schouten, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 13/633,735

(22) Filed: Oct. 2, 2012

(65) Prior Publication Data

US 2014/0092096 A1    Apr. 3, 2014

(51) Int. Cl.
| | |
|---|---|
| *G06T 11/20* | (2006.01) |
| *G06F 17/24* | (2006.01) |
| *G06Q 10/10* | (2012.01) |
| *G06F 17/22* | (2006.01) |

(52) U.S. Cl.
CPC ............. *G06T 11/20* (2013.01); *G06F 17/2247* (2013.01); *G06F 17/241* (2013.01); *G06F 17/243* (2013.01); *G06Q 10/10* (2013.01)

(58) Field of Classification Search
CPC ....... G06T 11/40; G06T 11/203; G06T 17/00; G06T 11/001; G06T 11/00; G06F 17/30011; G06F 17/2247; G06F 17/241; G06F 17/243; G06Q 10/10
USPC ........ 705/7.36, 7.39, 2, 7.41, 7.11, 7.32, 301, 705/35; 345/441, 440; 715/762, 738, 772, 715/234, 764
See application file for complete search history.

(56) References Cited

U.S. PATENT DOCUMENTS

| | | | |
|---|---|---|---|
| 6,738,529 B1 * | 5/2004 | Crevier et al. | 382/282 |
| 7,069,506 B2 | 6/2006 | Rosenholtz et al. | |
| 7,072,899 B2 * | 7/2006 | Lokken | 1/1 |
| 8,078,603 B1 | 12/2011 | Chandratillake et al. | |
| 8,131,533 B2 * | 3/2012 | Legault et al. | 703/22 |
| 8,683,370 B2 * | 3/2014 | Marchand et al. | 715/772 |
| 2004/0139390 A1 * | 7/2004 | Krolczyk et al. | 715/501.1 |
| 2005/0138020 A1 * | 6/2005 | Lokken | 707/3 |
| 2005/0231392 A1 * | 10/2005 | Meehan et al. | 340/995.1 |
| 2007/0219850 A1 * | 9/2007 | Fischer et al. | 705/10 |
| 2008/0059286 A1 * | 3/2008 | Nickerson et al. | 705/10 |
| 2008/0086688 A1 * | 4/2008 | Chandratillake et al. | 715/719 |
| 2008/0235075 A1 * | 9/2008 | Couture et al. | 705/10 |
| 2008/0238925 A1 * | 10/2008 | Meehan et al. | 345/441 |
| 2008/0319819 A1 * | 12/2008 | Clayton | 705/8 |
| 2009/0049409 A1 | 2/2009 | Leclercq et al. | |
| 2010/0211895 A1 * | 8/2010 | Mistry et al. | 715/764 |

(Continued)

*Primary Examiner* — Abderrahim Merouan
(74) *Attorney, Agent, or Firm* — Shumaker & Sieffert, P.A.

(57) ABSTRACT

Techniques are described for generating pattern representation images of business intelligence (BI) dashboard objects in a business intelligence (BI) dashboard. In one example, a method includes generating an image that represents a dashboard object in the business intelligence dashboard. The image may be based at least in part on one or more rules defined for metadata associated with the dashboard object. The method may include collecting the data from the dashboard object prior to generating the image. The metadata may include an indication of a type of display comprised in the dashboard object, and the method may further include generating the image with a theme associated with the type of the display. The theme may include one or more styles and one or more color schemes applied to the image.

16 Claims, 6 Drawing Sheets

(56) References Cited

U.S. PATENT DOCUMENTS

| | | | |
|---|---|---|---|
| 2011/0179066 A1* | 7/2011 | Cardno et al. | 707/769 |
| 2011/0208562 A1* | 8/2011 | Hartley et al. | 705/7.33 |
| 2011/0214081 A1* | 9/2011 | Dobrin et al. | 715/771 |
| 2011/0246925 A1* | 10/2011 | Marchand et al. | 715/772 |
| 2011/0314403 A1* | 12/2011 | Yan | 715/772 |
| 2012/0123989 A1* | 5/2012 | Yu et al. | 706/47 |
| 2012/0221510 A1* | 8/2012 | Li et al. | 707/602 |
| 2012/0226626 A1* | 9/2012 | Venkateswaran et al. | 705/342 |
| 2012/0226988 A1* | 9/2012 | Sharma et al. | 715/738 |
| 2013/0030875 A1* | 1/2013 | Lee et al. | 705/7.38 |
| 2013/0159926 A1* | 6/2013 | Vainer et al. | 715/804 |
| 2014/0082025 A1* | 3/2014 | Armitage | 707/802 |

* cited by examiner

PATTERN REPRESENTATION IMAGES FOR BUSINESS INTELLIGENCE DASHBOARD OBJECTS

TECHNICAL FIELD

The invention relates to business intelligence systems, and more particularly, to dashboard environments for business intelligence systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by many users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

Reporting and analysis end user products (typically referred to as Business Intelligence, or BI, tools) allow users to author reports and perform data exploration and analysis on a myriad of data sources, such as multi-dimensional data structures, relational databases, flat files, Extensible Markup Language ("XML") data, data streams, and unorganized text and data. BI tools may be used to prepare and aggregate individual reports and analyses by executing queries on underlying data sources, and to present those reports and analyses to a user-accessible format such as a BI dashboard environment.

SUMMARY

In general, examples disclosed herein are directed to generating pattern representation images of business intelligence (BI) dashboard objects in a business intelligence (BI) dashboard. These dashboard object pattern representation images informatively represent BI dashboard objects with pattern representations based on report types and elements of information that may quickly be gleaned from report metadata, and potentially also with themes and styles assigned to different dashboard objects based on their metadata. These dashboard object pattern representation images may be much easier than traditional BI dashboard thumbnails for a user to rapidly recognize and understand, particularly where a dashboard has several similar objects, such as reports of the same type for different time periods, for example.

In one example, a method includes generating an image that represents a dashboard object in a business intelligence dashboard. The image may be generated based at least in part on one or more rules defined for metadata associated with the dashboard object.

In another embodiment, a computing system includes one or more processors; one or more computer-readable data storage devices; and computer-executable program instructions, stored on the one or more computer-readable data storage devices for execution by the one or more processors, and configured for generating an image that represents a dashboard object in a business intelligence dashboard. The program instructions may generate the image based at least in part on one or more rules defined for metadata associated with the dashboard object.

In another embodiment, a computer-readable storage medium includes executable instructions stored on a non-transitory computer-readable storage medium. The executable instructions may be configured for causing one or more programmable processors to generate an image that represents a dashboard object in a business intelligence dashboard. The image may be generated based at least in part on one or more rules defined for metadata associated with the dashboard object.

The details of one or more embodiments of the invention are set forth in the accompanying drawings and the description below. Other features, objects, and advantages of the invention will be apparent from the description and drawings, and from the claims.

DETAILED DESCRIPTION

Various examples are disclosed herein for generating pattern representation images to represent business intelligence (BI) dashboard objects in a business intelligence (BI) dashboard, to quickly and informatively represent BI dashboard objects in a way that may clearly and intuitively distinguish similar BI dashboard objects, and without having to take the time to query underlying data sources. A system of this disclosure may generate an image that represents a dashboard object in a business intelligence dashboard, wherein the image is based at least in part on one or more rules defined for metadata associated with the dashboard object.

Figure 1:
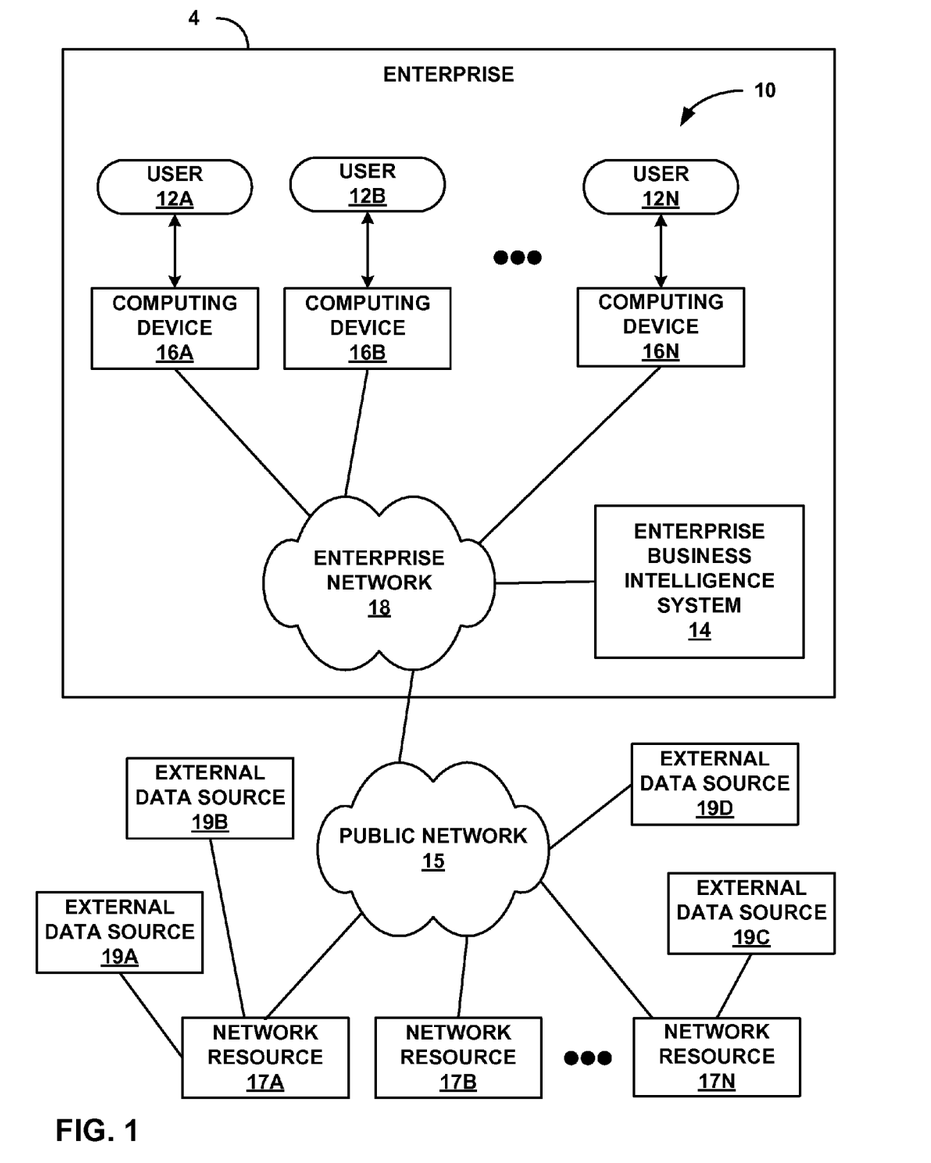
FIG. 1 is a block diagram illustrating an example enterprise having a computing environment in which users interact with an enterprise business intelligence system and data sources accessible over a public network.

FIG. 1 illustrates an example context in which a system of this disclosure may be used. FIG. 1 is a block diagram illustrating an example enterprise 4 having a computing environment 10 in which a plurality of users 12A-12N (collectively, "users 12") may interact with an enterprise business intelligence (BI) system 14. In the system shown in FIG. 1, enterprise business intelligence system 14 is communicatively coupled to a number of client computing devices 16A-16N (collectively, "client computing devices 16" or "computing devices 16") by an enterprise network 18. Users 12 interact with their respective computing devices to access enterprise business intelligence system 14. Users 12, computing devices 16A-16N, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In this example, enterprise BI system 14 includes servers that run BI dashboard web applications and may provide business analytics software. A user 12 may use a BI portal on a client computing device 16 to access a BI dashboard to view and manipulate information such as business intelligence reports ("BI reports") and other BI dashboard objects via their respective computing devices 16. This may include data from any of a wide variety of sources, including from multidimensional data structures and relational databases within enterprise 4, as well as data from a variety of external sources that may be accessible over public network 15. A single BI dashboard being generated or rendered on one of client computing devices 16 may include representations of a potentially large number of BI dashboard objects. These BI dashboard objects may include BI reports, text documents, other dashboards, and other BI dashboard objects.

Users 12 may use a variety of different types of computing devices 16 to interact with enterprise business intelligence system 14 and access a BI dashboard via enterprise network 18. For example, an enterprise user 12 may interact with enterprise business intelligence system 14 and run a business intelligence dashboard using a laptop computer, a desktop computer, or the like, which may run a web browser. Alternatively, an enterprise user may use a smartphone, tablet computer, or similar device, running a business intelligence dashboard in either a web browser or a dedicated mobile application for interacting with enterprise business intelligence system 14. In either case, a BI dashboard running on a user's computing device 16 may include representations of a potentially large number of BI reports and other BI dashboard objects from data sources within enterprise business intelligence system 14, as well as any of a variety of external network resources 17A-17N (collectively, "network resources 17") and any of a variety of external data sources 19A-19N (collectively, "external data sources 19") through public network 15.

Enterprise network 18 and public network 15 may represent any communication network, such as a packet-based digital network such as a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
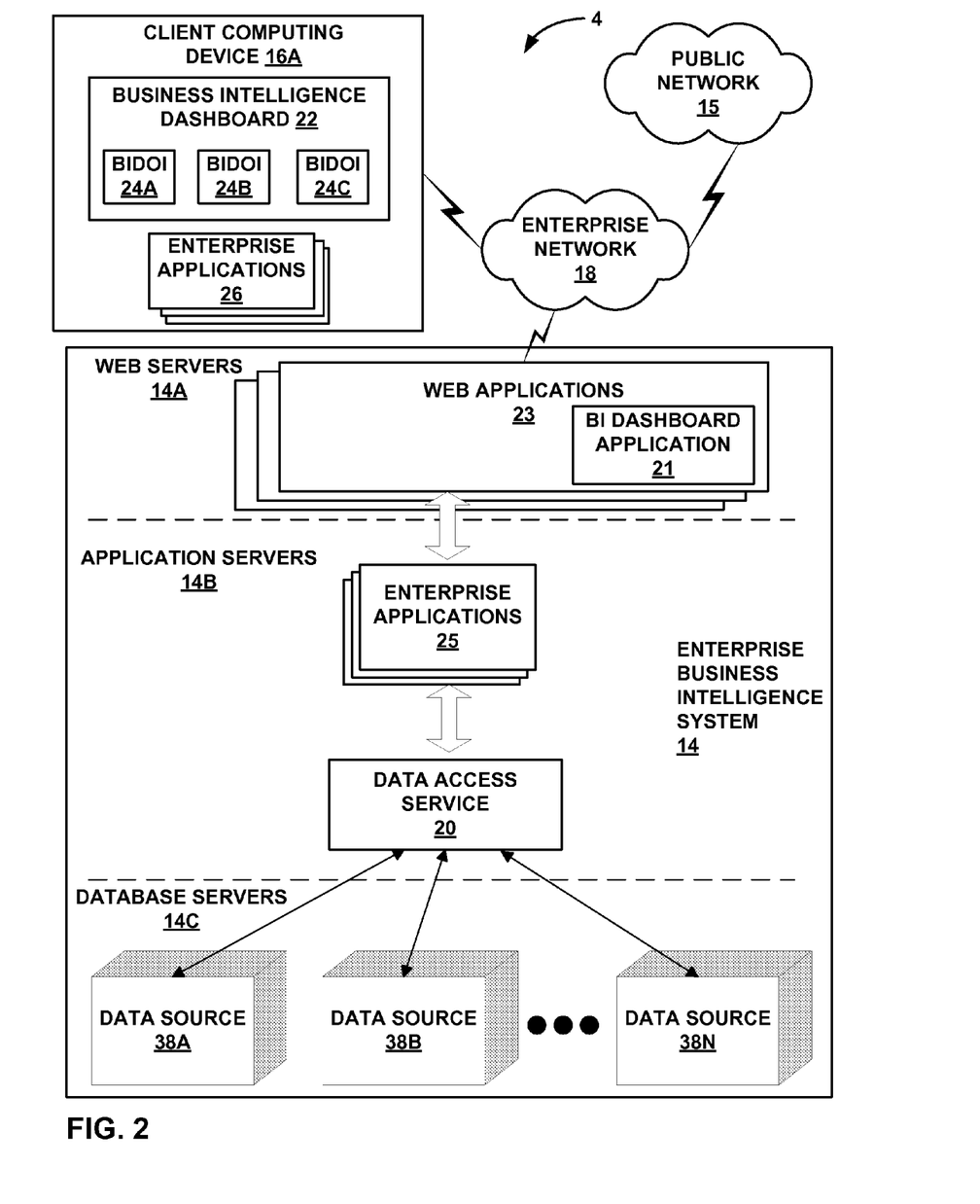
FIG. 2 is a block diagram illustrating one embodiment of an enterprise business intelligence system with a client computing device running a business intelligence dashboard with various pattern representation images for business intelligence dashboard objects.

FIG. 2 is a block diagram illustrating in further detail portions of one embodiment of an enterprise business intelligence (BI) system 14. In this example implementation, a single client computing device 16A is shown for purposes of example and includes a business intelligence (BI) dashboard 22, multiple BI dashboard object images 24A, 24B, 24C ("BI dashboard object images 24"), and one or more client-side enterprise software applications 26 that utilize and manipulate multidimensional data. BI dashboard 22 may be rendered within a general web browser application, within a locally hosted application or mobile application, or other user interface. BI dashboard 22 and BI dashboard object images 24 may be generated or rendered using any combination of application software and data local to the computing device it's being generated on, and remotely hosted in one or more application servers or other remote resources.

BI dashboard object images 24 may each represent an individual BI dashboard object from a different BI context or service. Each BI dashboard object may be a content element such as a BI report, e.g., that may be generated with enterprise business intelligence system 14, or another BI dashboard, as well as other types of BI dashboard objects such as web application widgets or other utility or data elements, that may be sourced from external resources through public network 15. The BI dashboard objects may also include content elements such as charts or graphs that may be sourced from within or external to the enterprise.

FIG. 2 depicts additional detail for enterprise business intelligence system 14 and how it may be used to provide a BI dashboard 22 for depicting and providing access to BI dashboard objects through BI dashboard object pattern representation images 24. A BI dashboard may contain a number of dashboard objects including reports, text documents, widgets, lists, charts, graphs, dashboards, or other dashboard object user interface elements that each represents, provides data from, or links to any of a variety of types of resource, such as a BI report, a software application, a database, a spreadsheet, a data structure, a flat file, Extensible Markup Language ("XML") data, a data stream, unorganized text or data, or other type of file or resource.

As depicted in FIG. 2, enterprise business intelligence system 14 is implemented in accordance with a three-tier architecture: (1) one or more web servers 14A that provide web applications 23 with user interface functions, including a BI dashboard application 21; (2) one or more application servers 14B that provide an operating environment for enterprise software applications 25 and a data access service 20; and (3) database servers 14C that provide one or more data sources 14C. The data sources 14C may include two-dimensional databases and/or multidimensional databases, i.e. cubes. The data sources may be implemented using a variety of vendor platforms, and may be distributed throughout the enterprise. As one example, the data sources 14C may be multidimensional databases configured for Online Analytical Processing (OLAP). As another example, the data sources 14C may be multidimensional databases configured to receive and execute Multidimensional Expression (MDX) queries of some arbitrary level of complexity. As yet another example, the data sources 14C may be two-dimensional relational databases configured to receive and execute SQL queries, also with an arbitrary level of complexity.

Multidimensional data structures are "multidimensional" in that each multidimensional data element is defined by a plurality of different object types, where each object is associated with a different dimension. The enterprise applications 26 on computing device 16A may issue business queries to enterprise business intelligence system 14 to build reports.

Enterprise business intelligence system 14 includes a data access service 20 that provides a logical interface to the data sources 14C. Client computing device 16A may transmit query requests through enterprise network 18 to data access service 20. Data access service 20 may, for example, execute on the application servers intermediate to the enterprise applications 25 and the underlying data sources in database servers 14C. Data access service 20 retrieves a query result set from the underlying data sources, in accordance with query specifications. Data access service 20 may intercept or receive queries, e.g., by way of an API presented to enterprise applications 26. Data access service 20 may then return this result set to enterprise applications 26 as BI reports and/or other BI objects that are made accessible in BI dashboard 22 on client computing device 16A. The process of generating a BI dashboard 22 may therefore involve a number of steps and interactions among a potentially significant number of layers and data sources and a significant amount of complexity.

BI dashboard 22 running on client computing device 16A may include a potentially large number of different BI objects accessible through it, many of which may be from the same type or series of objects, and may have very similar names or have very similar appearances if rendered in traditional thumbnail images. Instead, BI dashboard 22 may display BI dashboard object images 24 in the form of pattern representation images, which BI dashboard application 21 may generate in this example, as discussed in further detail in reference to FIG. 3.

Each of the BI dashboard objects or displays included in the dashboard objects may be associated with a multidimensional data structure, a database, an external web application, or other data source, and provide access to or be populated or defined by a corresponding data source. The data representation features may provide representations or visualizations of data from multidimensional data structures, databases, or other data sources. The data representation features may provide representations or visualizations of data categorized among multiple dimensions such as geographical areas, product categories, sales channels, currencies, and various financial metrics such as unit sales, costs, revenues, profits, and margins, for example.

Various dashboard objects or displays included in the dashboard objects may be drawn from or based on data sources within an enterprise business intelligence system, and from external data sources that are external to the enterprise business intelligence system. The dashboard objects or displays included in the dashboard objects may include, for example, BI reports generated with a multidimensional business intelligence data access service, BI reports, web application widgets, web pages, software applications, databases, spreadsheets, news feeds, weather reports, stock market tickers, or tickers for other markets such as indexes, bonds, commodities, mutual funds, exchange traded funds (ETFs), real estate investment trusts (REITs), etc., or any other data source or resource.

As an illustrative example, a BI dashboard object may be or include a BI report for sales of sporting goods by an enterprise. In this example, the BI dashboard object may include selectable options for viewing various categories of sporting goods, such as golf equipment, hiking equipment, mountaineering equipment, skiing equipment, and running equipment. In this example, the BI report may be a report on sales through various order methods from different countries, with columns for countries, order methods, unit sales, and revenues, for example.

Figure 3:
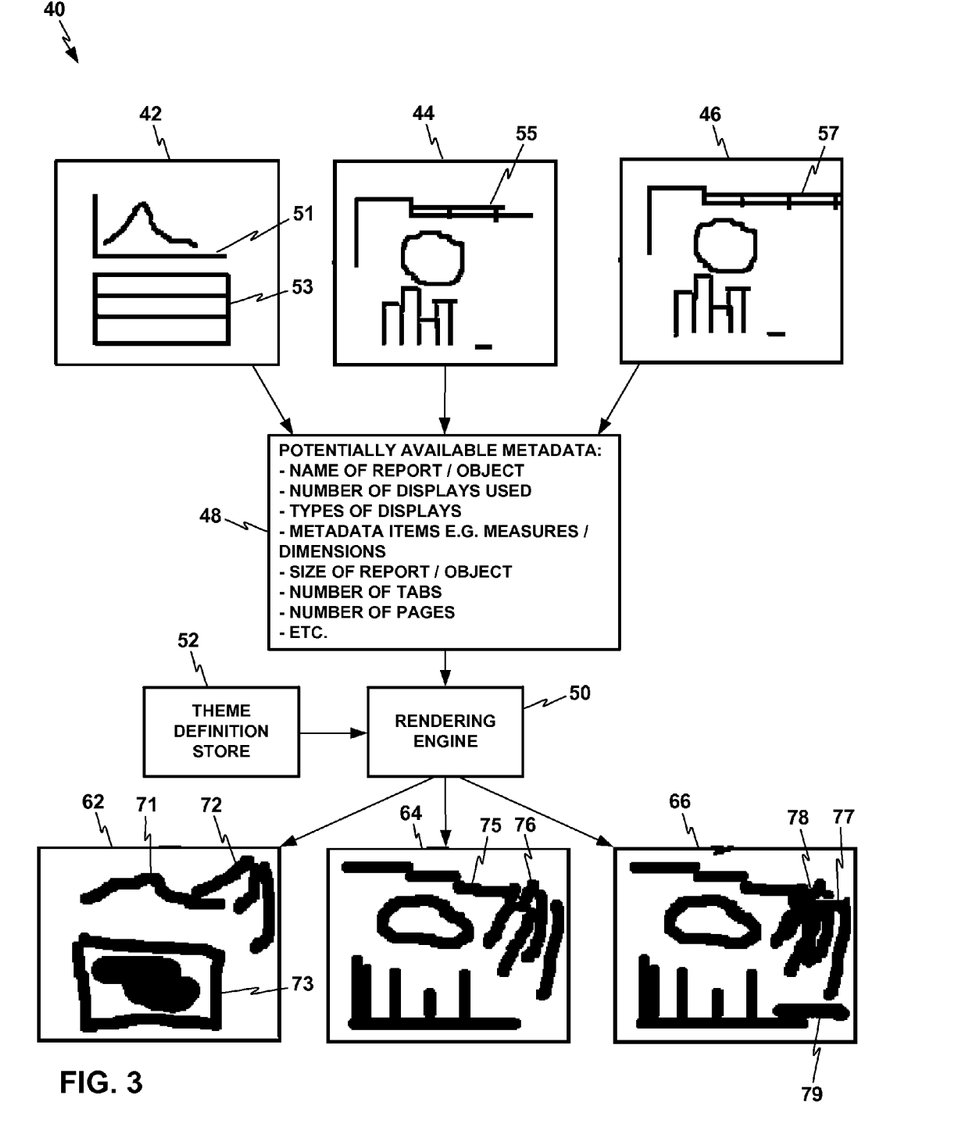
FIG. 3 depicts a schematic diagram of a system for generating pattern representation images for business intelligence dashboard objects.

FIG. 3 depicts a schematic diagram of a BI dashboard pattern representation system 40, i.e., a system for generating pattern representation images for business intelligence dashboard object. BI dashboard pattern representation system 40 may operate on enterprise business intelligence system 14 of FIGS. 1 and 2, such as by operation of BI dashboard application 21. Generally, BI dashboard pattern representation system 40 may operate on BI dashboard objects 42, 44, 46 to generate pattern representation images 62, 64, 66 that represent BI dashboard objects 42, 44, 46, respectively, for display on client computing device 16A. To do this, BI dashboard pattern representation system 40 may read or collect metadata 48 from each BI dashboard object 42, 44, 46, and pass the metadata to rendering engine 50. For each dashboard object 42-46, rendering engine 50 renders an image based at least in part on one or more rules defined for metadata associated with the dashboard object, thereby generating a pattern representation image, i.e. pattern representation images 62-66, each of which represents one of the dashboard objects. As shown in FIG. 3, representative metadata 48 collected from each dashboard object 42-46 may illustratively include the names of the report or other dashboard object, the number of displays the object includes, an indication of the types of displays the object includes, metadata items, the size of the report or other object, the number of tabs (such as in a report), the number of pages (such as in a report or a text document), etc.

BI dashboard pattern representation system 40 may also include a theme definition store 52 that may provide themes and/or styles to rendering engine 50. Rendering engine 50 may apply one or more themes from theme definition store 52 in rendering one of pattern representation images 62-66 based on the type of display included in the dashboard object 42-46. For example, a dashboard object may include a single display or multiple displays, where each display may be a business intelligence report ("BI report"), a text document, a list, a chart, a graph, a dashboard, etc., and rendering engine 50 may apply a different theme depending on which of these types characterizes the dashboard object. Each theme may include one or more styles or one or more color schemes that may be applied to the pattern representation image, i.e., that may be applied in rendering one of pattern representation images 62-66.

Pattern representation images 62-66 may have a more abstract visual appearance than the original dashboard objects 42-46, in a way that magnifies and makes more apparent differences between the dashboard objects 42-46, that may be relatively minor or not at all apparent in traditional dashboard thumbnail images. Generally, it may be helpful to represent a BI dashboard object with a pattern representation, which may use abstract visual patterns to represent useful information about the associated BI dashboard object to the user. Typically, BI dashboard objects may be represented by thumbnail images based on minimized images of the reports themselves. A typical BI dashboard may include a large number of similar dashboard objects, such as BI reports, that may have a very similar appearance to each other, and that may therefore be hard to distinguish in minimized thumbnail image size. For example, a BI dashboard may typically have a large number of thumbnail images of BI reports from different periods of time in a consecutive series. In this example, each of the BI report thumbnail images from a time series may have the same format, with tables, charts, and graphs in the same positions, and the user may need to try to distinguish minor differences, on a small scale, in written text or in details of charts or graphs. In contrast, a BI dashboard using pattern representation images for the BI dashboard objects may present large-scale, intuitive, visual differences between representational images of similar reports or other types of BI objects that are similar to each other, based on large-scale pattern representation of information from the metadata from the dashboard objects, for example.

Various examples detailed herein provide pattern representation images for BI dashboard objects using pattern representations of metadata from the BI dashboard objects. Some examples further include styles and/or themes applied to the images for the BI dashboard objects, which may also be based on metadata from the BI dashboard objects, such as a different theme for each type of dashboard object. Pattern representation images for BI dashboard objects may make the representations of the dashboard objects more engaging, easier to interpret, and easier to remember. The metadata from the BI dashboard objects may include aggregated data, years or other time intervals, geographic indicators, numbers of rows or columns from a chart, etc., for example. BI system 14 may also generate BI dashboard object pattern representation images entirely on the server side within BI system 14 and without relying on software on the client computing devices 16, and thereby comply with requirements for enterprise software to be "zero footprint" on the client side, i.e., on client computing devices 16.

As shown in FIG. 3, a pattern representation image may be generated that does not necessarily resemble the appearance of a BI report or other dashboard object represented by the image. Rather, the pattern representation image may include visual elements that reflect or evoke the content of the report or other dashboard object, in a way that may be abstract and/or visually striking, and that may convey the nature of the dashboard object and convey essential information from the dashboard object. BI system 14 may generate the visual elements of the pattern representation image based on rules that may abstractly interpret identifying information and/or other information from the metadata of the business object. The visual elements of the pattern representation image may more clearly distinguish among different reports or other objects that are from the same type, series, or class, or that otherwise may typically be difficult to distinguish among in traditional thumbnail images or names in a list.

For example, a BI dashboard may include BI reports entitled "Sales Report 2009", "Sales Report 2010", and "Sales Report 2011". If presented in a BI dashboard in traditional thumbnail images, the reports may all have the same layout and visual format and may appear almost indistinguishable, other than for titles or values listed in fields in a chart that may appear in very small and potentially illegible writing. Pattern representation images may instead present distinguishing features or information from the reports or other dashboard objects interpreted or abstracted in large-scale, bold visual patterns that may convey a lot of information within a small space and that may represent the underlying information according to predictable rules. Pattern representation images may therefore represent dashboard objects in a way that may increase the ease with which users may recognize and distinguish among objects in a dashboard, and gain and understand information from the objects from their representations in the dashboard.

As particular examples, BI object 42 includes a graph 51 and a chart 53, which are rendered in a more abstract form in pattern representation image 62 as graph icon 71 and chart icon 73, respectively, using metadata from the original BI object but without being constrained to a simple minimized visual reproduction of the original appearance of graph 51 and chart 53. Additionally, BI object 42 may be a BI report based on a multidimensional data source with multiple dimensions, a status that is not visually apparent from the original appearance of BI object 42, though. However, the metadata associated with BI object 42 includes metadata items that indicate the number of dimensions, such as three dimensions in the multidimensional data source for this BI report.

Rendering engine 50 may also incorporate rules for generating abstract representations of metadata items such as dimensions and measures, such as to generate a generally vertical line for each dimension and a generally horizontal line for each measure in the upper-right region of the pattern representation image. Rendering engine 50 may detect the indication of three dimensions for the associated multidimensional data source in the metadata 48, and include an abstract indication of this with dimensions icon 72 rendered as part of pattern representation image 62. Rendering engine 50 therefore not only provides more visually striking abstractions of graph 51 and chart 53, but also provides a visual indication of information that is not at all visually apparent from the original appearance of BI dashboard object 42, in the form of dimensions icon 72.

The rules for rendering engine 50 to generate a visual pattern to represent dimensions and measures of a multidimensional data source of a BI report may also include a rule to generate one generally horizontal line in the same upper-right region to represent each measure, if multiple measures are present. The rules for rendering engine 50 may also include rules for modifying these generally vertical and horizontal lines away from simply straight vertical and horizontal, where these modifications may encode additional information about these dimensions and/or measures. Dimensions icon 72 includes significant deviations from simple straight vertical lines, thereby revealing, in a very simple and easily noticeable manner, additional information about the underlying dimension information.

The additional information may be based on rules regarding differences or trends in the data from one dimension to another, as stored in metadata from a previous run of the object, for example. While this information is not explicitly conveyed within the relatively small and simple image of pattern representation image 62, such a function would be beyond the purpose of a single representative image in a BI dashboard. Rather, the modified shapes of the lines such as in dimensions icon 72 may provide an easy and distinctive way of individualizing or customizing each pattern representation image, and making it readily distinct and easy to differentiate from a potentially large number of other pattern representation images in a BI dashboard, in a way that is based on the underlying metadata. Beyond this, a user may come to learn any consistent rules for individualizing the pattern representation images, so that the user may become able to glean significant information about the underlying business objects simply from small differences in the visual representations of the pattern representation images.

FIG. 3 shows further advantages of how pattern representation images may more clearly differentiate different dashboard objects, in the examples of dashboard objects 44 and 46 and their resulting pattern representation images 64 and 66. Dashboard objects 44 and 46 are very similar to each other, such as may be the case for different dashboard objects from a time series of objects. Dashboard objects 44 and 46 differ in appearance from each other only in that dashboard object 46 has one additional tab in its tab sequence 57 relative to tab sequence 55 of dashboard object 44. Rendering engine 50 may render a descending sequence of horizontal lines across the top of each pattern representation image to represent each tab in the original dashboard object, resulting in a descending sequence 75 of three horizontal lines across the top of pattern representation image 64, and a descending sequence 77 of four horizontal lines across the top of pattern representation image 66.

As with BI dashboard object 42 and pattern representation image 62, BI dashboard objects 44 and 46 may be based on multidimensional data sources without this being apparent in the visual appearance of BI dashboard objects 44 and 46, while it is made visually apparent in pattern representation images 64 and 66. In particular, pattern representation images 64 and 66 include dimensions icons 76 and 78, respectively, to visually represent the dimensions of the multidimensional data sources of BI dashboard objects 44 and 46. Furthermore, BI dashboard objects 44 and 46 have different numbers of dimensions in their associated multidimensional data sources, which is incorporated in their respective dimensions icons 76 and 78, where dimensions icon 76 indicates five dimensions and dimensions icon 78 indicates six dimensions. Dimensions icons 76 and 78 therefore help make pattern representation images 64 and 66 further distinguishable from each other, in addition to conveying additional valuable information about the underlying resources relative to the original BI dashboard objects 44 and 46.

As yet another difference, the metadata for BI dashboard object 46 indicates that it has an additional page associated with it, in this example, which is also not at all apparent from the appearance of the original BI dashboard object 46. Rendering engine 50 may include a rule to render a horizontal line along the bottom of a pattern representation image to visually represent each additional page of a BI dashboard object, which is rendered as extra page icon 79 in pattern representation image 66. Once again, this aspect of the pattern representation images both conveys valuable information not apparent in the original BI dashboard objects, and helps make the pattern representation images more distinct from each other and easier to tell apart. Rendering engine 50 may also simply visually depict other elements from the original BI dashboard objects in a more visually striking manner, such as with the chart icons in pattern representation images 64 and 66 compared with the original charts in BI dashboard objects 44 and 46, that may be easier to distinguish when many pattern representation images are present together in a BI dashboard.

Additionally, while not depicted in the black and white format of the attached figures, rendering engine 50 may also apply color scheme rules for rendering the elements of the pattern representation images 62-66 in a variety of vivid colors that also convey useful and differentiating information about the corresponding dashboard objects, based on the metadata, and potentially also data from the dashboard objects. In any case where data is represented, in some examples, it may be sourced as data from a previous run of the dashboard object that is then stored on the server side as metadata associated with the dashboard object, so that it may be read and used rapidly in rendering pattern representation images 62-66. The data from a previous run stored as metadata may include a number of pages in the dashboard object, or a data size of a display in the dashboard object, for example, and the method further comprises generating the pattern representation image with a visual indication of the number of pages or the data size of the display. The data size of the display may include a range of rows in a list or a size of a crosstab in the dashboard object, for example.

Several examples of rendering rules for rendering engine 50 are presented above. Those and several other example rendering rules for rendering engine 50 may be as follows in Table 1, in an illustrative implementation. For each example of a rendering rule in Table 1 includes the available metadata (m), or in some cases data (d), on which the rule acts; the form of the input for the rule; an import rule that may affect how the input of the data or metadata is accepted as input; the rendering rule itself; and in some cases, a location rule for where in the pattern representation image the rendering engine positions the resulting visual representation according to that rule.

TABLE 1

| Available metadata (m)/ data (d) | Input | Input rule | Rendering rule example | Location Rule |
|---|---|---|---|---|
| Name of Report (m) | Length of text | 60 characters or more is 100% | Use percent of text length as heading creation | Reserve a line space from 10% from left, and place from 5% at top. |
| Name of report (m) | Text content | Use a calculation to define a color | Use color for the line space | |
| Number of displays (m) | Number of displays | First three displays | If there is a single display, use full space; if there are two displays, place first display on top of second; if there are three displays, place them stacked; if there are more displays, draw ellipsis | Reserve 60% from left for showing displays, and leave 20% at bottom free) |
| Type of displays shown (m) | Type of report part (e.g. crosstab, list, bar chart, line chart, bubble chart, etc.) | Known display types | If display type is known, show that one in the respective creative shape; if display type is unknown, show that one as an | |

TABLE 1-continued

| Available metadata (m)/ data (d) | Input | Input rule | Rendering rule example | Location Rule |
|---|---|---|---|---|
| | | | "other" creative shape | |
| Data Size of display (d) | Only available when report was run before by user or another user. | Range of rows in a list (e.g. 1-100 rows, 101-500 rows); size of crosstab (e.g. number of rows, number of columns) | Depending on size of list, show smaller, or larger colored blob; depending on size of crosstab, shape of colored blob is different | Blob is placed within a display depiction |
| Name of display (d, m) | Subtitle for display, if not available, use name of display type | Use a fun calculation to define a color, but use another one than for the other calculations. | Use color for the defined blob in display | |
| Metadata items (m) | Type of metadata + number of metadata items (e.g. Geography, Time, Organization, Revenue, Cost) | Dimensions vs. Measures; Names of Dimensions/ Measures | If Dimensions, show vertically oriented line per dimension, for next dimension, show it in an adjacent slightly angled spot; if Measures, show horizontally oriented line per measure, for next measure, show it in an adjacent slightly curved way | |
| Metadata names (m) | Metadata name | Use a calculation to define a color, e.g. if letter starts in first area of alphabet, provide green, if in second area, show blue, etc. | Use color for the defined line | On 40% on the right, show the metadata items, vertical lines at the top and horizontal lines are mixed |
| Number of tabs (m) | Available tabs | First 4 tabs | If there is a single tab, show at top left; for every following tab, show it adjacent or a bit lower; if more than 4 tabs, represent the rest with ellipsis | Below the name of the report area |
| Number of pages (d) | Available pages, only available when report was run before. | Range of pages | If more than 1 page, show an extra line at the bottom; if more than 5 pages, show another line; if more than 20 pages, show a third and final line at the bottom | Lines at the bottom, bottom 20% |

The rules presented in Table 1 are by way of example only and are illustrative and suggestive of the types of rules that may be applied, such as by rendering engine 50 in system 40. Any of a wide variety of rules may be applied in generating pattern representation images of BI dashboard objects. By using techniques such as these, server-side BI dashboard application 21 may generate a pattern representation image that may be specifically and clearly evocative of its corresponding BI dashboard object, so that the pattern representation image may enable the user to identify and distinguish among the corresponding dashboard objects rapidly and easily, even though the pattern representation images don't use a direct rendering of the dashboard objects themselves or a small-scale version of the actual content of the dashboard objects.

Generating pattern representation images based on the dashboard object metadata instead of the actual content of the dashboard objects may also be useful not only in response time, but also in consistency across browsers and operating systems of the client computing devices. The identifying information and formatting data for rendering the pattern representation images on a client computing device may be conveyed in JavaScript and be universal to all browsers, whereas reproduction of an image of the dashboard itself may require data from proprietary or non-universal add-ons, for example. The techniques described herein make reference to business intelligence reports generated with the MDX query language and the SQL query language, as illustrative examples of a multidimensional data query language and a relational database query language, respectively. However, the techniques described herein may be applied to reports generated with any other structured language or tool capable of querying any type of data structures, or with any type of query result set or any other type of data.

Figure 4:
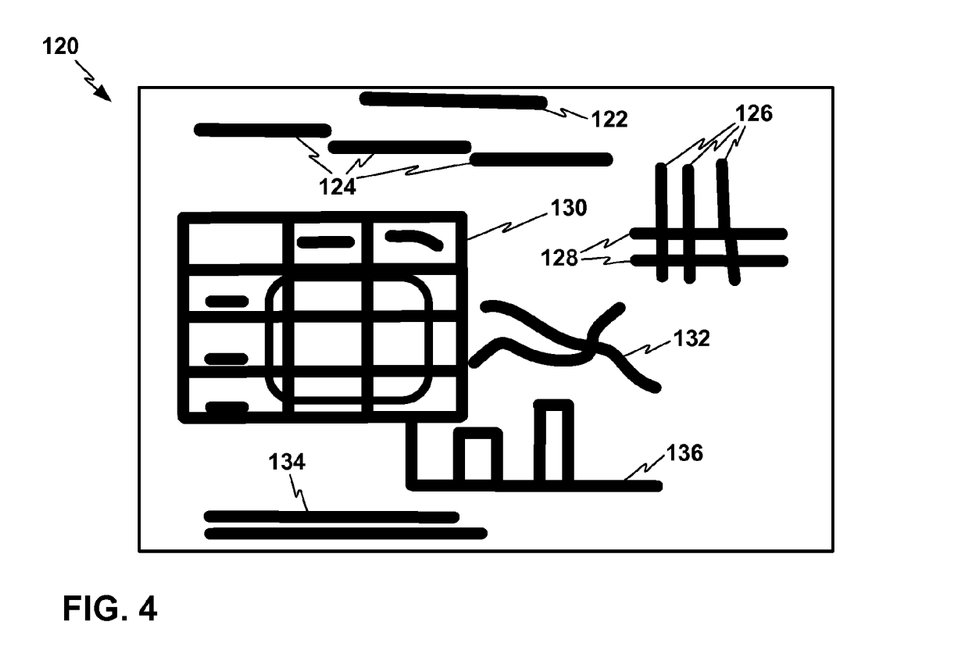
FIGS. 4 and 5 depict example pattern representation images for business intelligence dashboard reports.
Figure 5:
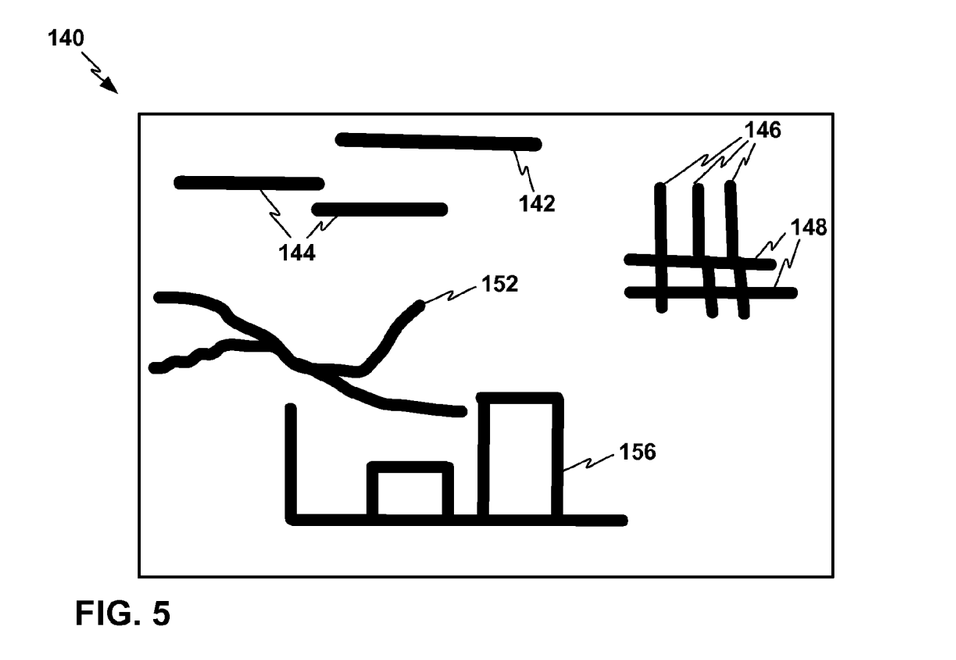

FIGS. 4 and 5 depict additional example pattern representation images 120, 140 for business intelligence dashboard objects, that further illustrate some example rendering rules in accordance with those disclosed above. Pattern representation image 120 in FIG. 4 includes an upper horizontal line 122 to represent the name of the dashboard object. Cascading horizontal lines 124 in the upper region to represent tabs, as discussed above. Generally vertical lines 126 and generally horizontal lines 128 represent dimensions and measures of an underlying multidimensional data source, as discussed above. Grid icon 130 to represent a crosstab report (i.e., a crosstab), with modifications to the grid icon to convey additional information from the metadata on the crosstab, such as the data size of the crosstab, e.g., the range of rows and number of columns in the crosstab. Graph icon 132 and chart icon 136 visually represent a corresponding graph and chart from the corresponding dashboard object. Horizontal lines 134 represent two additional pages, which would not be visually apparent from the original BI dashboard report.

Pattern representation image 140 in FIG. 5 shares several similarities with pattern representation image 120 in FIG. 4, as well as several differences that would not be apparent from the appearance of their original BI dashboard objects. Pattern representation image 140 in FIG. 5 also includes an upper horizontal line 142 to represent the name of the dashboard object, and only two cascading horizontal lines 144 instead of three in the upper region to represent two tabs, in a more visually striking indication than a traditional visual representation of tabs. Generally vertical lines 126 and generally horizontal lines 128 represent the presence of three dimensions and two measures of an underlying multidimensional data source, which is shared in common with the example of FIG. 4, but which would not be visually apparent for either one, in a traditional dashboard object rendering. Pattern representation image 140 lacks a grid icon 130 like grid icon 130 in FIG. 4, indicating that the underlying BI dashboard object does not have a crosstab report, thereby providing the most immediately obvious visual distinction between pattern representation images 120 and 140.

Pattern representation image 140 also includes graph icon 152 and chart icon 156 to visually represent a corresponding graph and chart from the corresponding dashboard object, and with obvious visual differences from graph icon 132 and chart icon 136 of pattern representation image 120. Additionally, the rendering engine in these examples may have flexible positioning rules to take full advantage of the available space in the generally central region of the pattern representation images for elements such as icons representing crosstabs, charts, and graphs, resulting in very different placement and sizing for the graph icon 152 and chart icon 156 in pattern representation image 140, and resulting in another substantial magnification of the differences in appearance between pattern representation images 120 and 140, much more so than in the original dashboard objects. Finally, pattern representation image 140 also lacks any counterpart of horizontal lines 134 from pattern representation image 120, indicating that the corresponding dashboard object does not include additional pages, and providing yet another distinguishing feature between the two examples. As discussed above, rendering engine 50 may also apply rules for rendering each of pattern representation images 120, 140 in vivid, contrasting colors.

Figure 6:
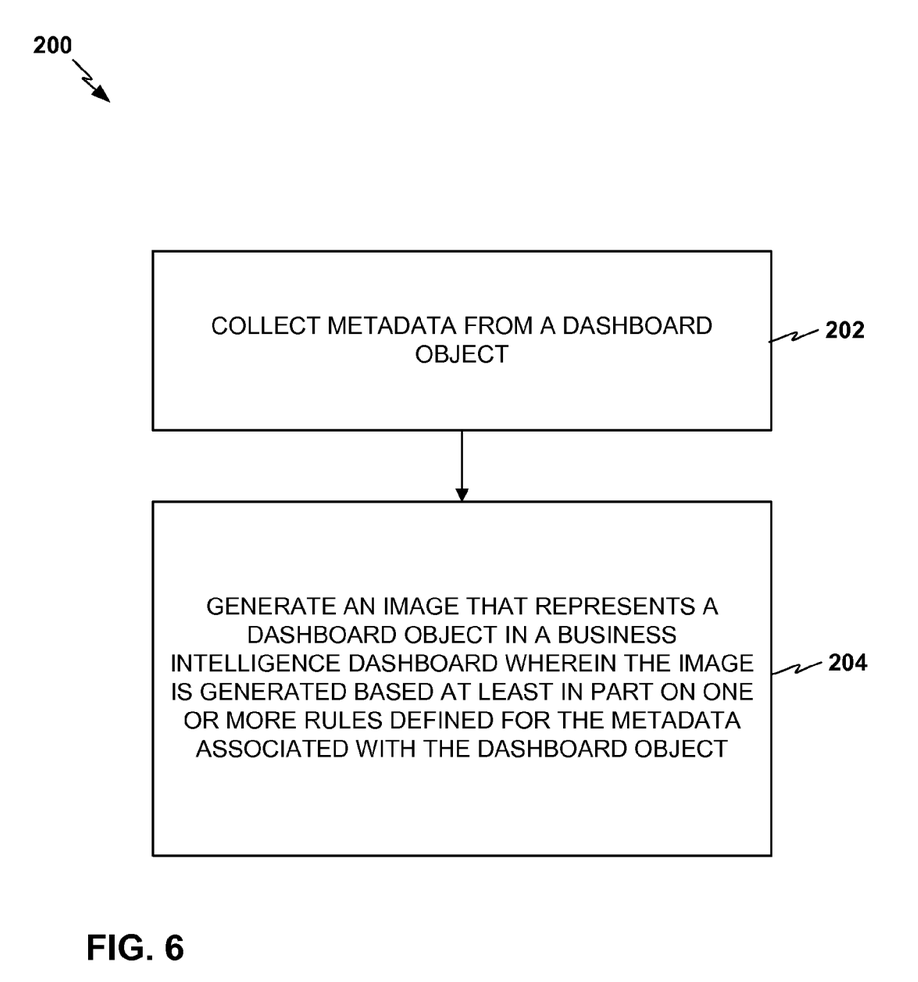
FIG. 6 is a flowchart illustrating example operation of a system for generating pattern representation images for business intelligence dashboard objects.

FIG. 6 is a flowchart for an example process 200 that may be performed by a pattern representation rendering engine, such as may be included as part of business intelligence dashboard application 21 or more generally as part of an enterprise business intelligence (BI) system 14, in generating pattern representation images of business intelligence dashboard objects. Although described in reference to enterprise business intelligence system 14 of FIGS. 1 and 2 and BI portal application 21 as depicted in FIG. 2 and described in connection with FIGS. 2-5, the principles of process 200 should not be limited to the embodiments described above, and may be applied to any system for a business intelligence portal that is capable of generating BI dashboard thumbnail images.

As shown in FIG. 6, BI dashboard application 21 may collect metadata, e.g., metadata 48 in FIG. 3, from a dashboard object, e.g., BI dashboard objects 42-46 in FIG. 3 (202). BI dashboard application 21 may then, such as by way of rendering engine 50 in FIG. 3, generate an image, such as pattern representation images 62-66 in FIG. 3, that represent each dashboard object, such as BI dashboard objects 42-46 in FIG. 3, in a business intelligence dashboard, wherein the image is generated based at least in part on one or more rules defined for metadata associated with the dashboard object (204). BI dashboard application 21 may perform any of a variety of additional functions as well, such as applying themes from theme definition store 52 in FIG. 3, based on the types of the dashboard objects or displays included in the dashboard objects, in rendering the pattern representation images.

Figure 7:
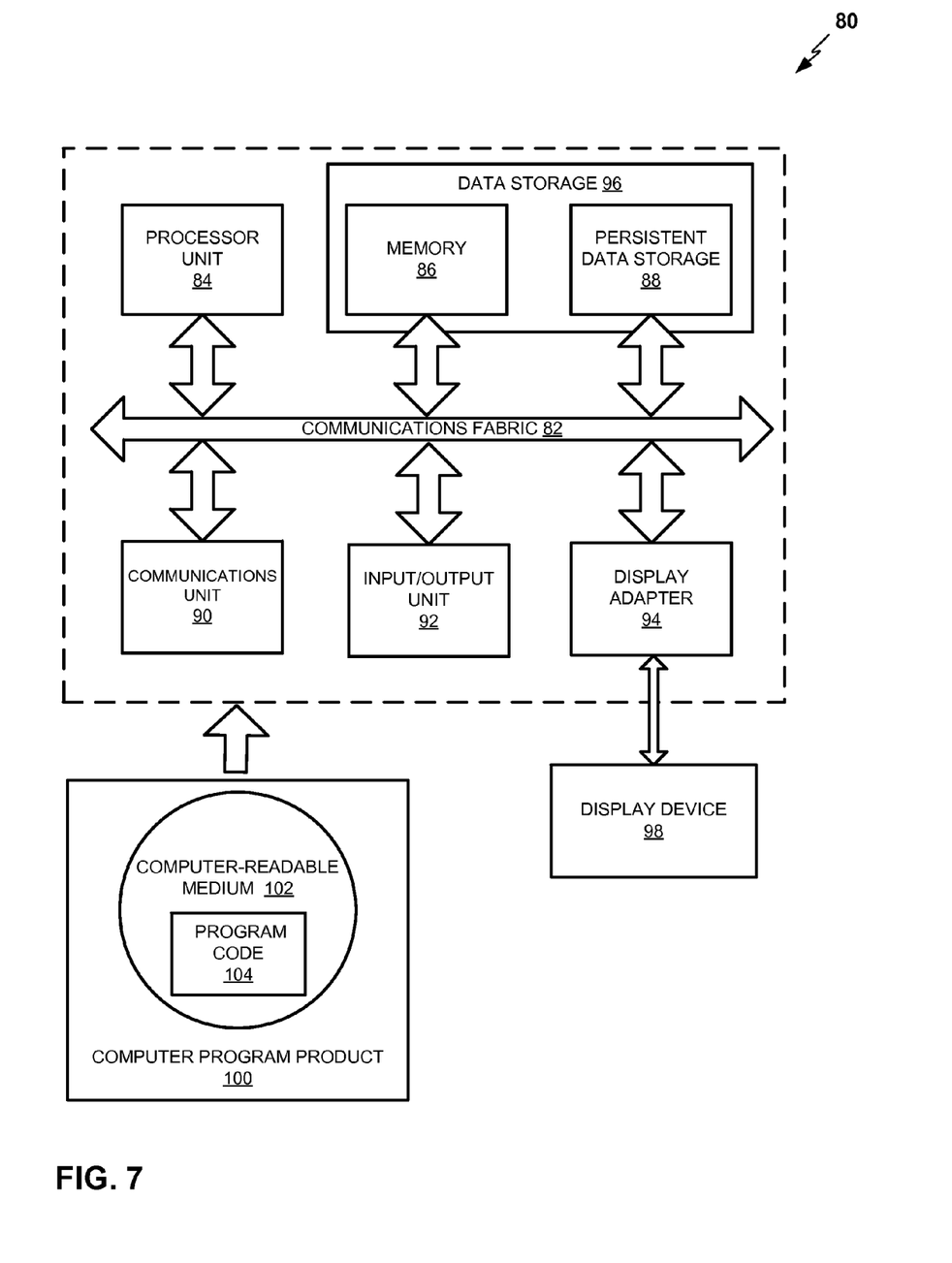
FIG. 7 is a block diagram of a computing device that may execute a system for generating pattern representation images for business intelligence dashboard objects.

FIG. 7 is a block diagram of a computing device 80 that may be used to run a BI dashboard pattern representation system, according to an illustrative example. Computing device 80 may be a server such as one of web servers 14A or application servers 14B as depicted in FIG. 2. Computing device 80 may also be any server for providing an enterprise business intelligence application in various examples, including a virtual server that may be run from or incorporate any number of computing devices. A computing device may operate as all or part of a real or virtual server for generating BI dashboard object pattern representation images, and may be or incorporate a workstation, server, mainframe computer, notebook or laptop computer, desktop computer, tablet, smartphone, feature phone, or other programmable data processing apparatus of any kind Other implementations of a computing device 80 may include a computer having capabilities or formats other than or beyond those described herein.

In the illustrative example of FIG. 7, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a BI dashboard pattern representation system, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, a mobile device operating system such as iOS® from Apple® Inc., or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

As will be appreciated by a person skilled in the art, aspects of the present disclosure may be embodied as a method, a device, a system, or a computer program product, for example. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible, non-transitory data storage medium, as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. A non-exhaustive list of additional specific examples of a computer readable storage medium includes the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

Program code embodied on a computer readable medium may be transmitted using any appropriate medium, including but not limited to radio frequency (RF) or other wireless, wire line, optical fiber cable, etc., or any suitable combination of the foregoing. Computer program code for carrying out operations for aspects of the present invention may be written in any combination of one or more programming languages, including an object oriented programming language such as Java, Smalltalk, C++, Objective-C, or the like, or other imperative programming languages such as C, or functional languages such as Common Lisp, Haskell, or Clojure, or multi-paradigm languages such as C#, Python, Ruby, or Scala, among a variety of illustrative examples. One or more sets of applicable program code may execute partly or entirely on the user's desktop or laptop computer, smartphone, tablet, or other computing device; as a stand-alone software package, partly on the user's computing device and partly on a remote computing device; or entirely on one or more remote servers or other computing devices, among various examples. In the latter scenario, the remote computing device may be connected to the user's computing device through any type of network, including a local area network (LAN) or a wide area network (WAN), or the connection may be made to an external computer (for example, through a public network such as the Internet using an Internet Service Provider), and for which a virtual private network (VPN) may also optionally be used.

In various illustrative embodiments, various computer programs, software applications, modules, or other software elements may be executed in connection with one or more user interfaces being executed on a client computing device, that may also interact with one or more web server applications that may be running on one or more servers or other separate computing devices and may be executing or accessing other computer programs, software applications, modules, databases, data stores, or other software elements or data structures. A graphical user interface may be executed on a client computing device and may access applications from the one or more web server applications, for example. Various content within a browser or dedicated application graphical user interface may be rendered or executed in or in association with the web browser using any combination of any release version of HTML, CSS, JavaScript, XML, AJAX, JSON, and various other languages or technologies. Other content may be provided by computer programs, software applications, modules, or other elements executed on the one or more web servers and written in any programming language and/or using or accessing any computer programs, software elements, data structures, or technologies, in various illustrative embodiments.

Aspects of the present invention are described herein with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, may create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices, to produce a computer-implemented process such that the instructions that execute on the computer or other programmable apparatus provide or embody processes for implementing the functions or acts specified in the flowchart and/or block diagram block or blocks.

The flowchart and block diagrams in the figures illustrate the architecture, functionality, and operation of possible implementations of devices, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may be executed in a different order, or the functions in different blocks may be processed in different but parallel processing threads, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of executable instructions, special purpose hardware, and general-purpose processing hardware.

The description of the present disclosure has been presented for purposes of illustration and description, and is not intended to be exhaustive or limited to the disclosure in the form disclosed. Many modifications and variations will be understood by persons of ordinary skill in the art based on the concepts disclosed herein. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims.

What is claimed is:

1. A method comprising:

receiving, by one or more computing devices, business intelligence (BI) dashboard metadata for a plurality of dashboard objects, wherein respective dashboard objects among the dashboard objects are based on respective multidimensional data sources, wherein the metadata for each respective dashboard object indicates a number of dimensions of the respective multidimensional data source, a number of measures of the respective multidimensional data source, a number of tabs of the respective multidimensional data source, and types of displays comprised in the respective dashboard object; and generating, by the one or more computing devices, based on the BI dashboard metadata for the plurality of dashboard objects, a plurality of images in a business intelligence dashboard, wherein respective images among the plurality of images represent respective dashboard objects among the plurality of dashboard objects, wherein generating the respective images is based at least in part on one or more rules defined for generating the images with respective visual patterns to represent characteristics of the metadata associated with the respective dashboard objects represented by the respective images, and wherein generating the respective images based at least in part on the one or more rules comprises generating the respective images with a plurality of generally vertical lines to represent the number of dimensions of the respective multidimensional data sources; a plurality of generally horizontal lines to represent the number of measures of the respective multidimensional data sources; a plurality of cascading horizontal lines to represent a number of tabs of the respective multidimensional data sources; and one or more icons representing the types of displays, wherein the icons comprise at least one of a crosstab icon, a chart icon, and a graph icon.

2. The method of claim 1, further comprising:
receiving themes from a theme definition store; and
generating the respective images with a different theme, from among the themes from the theme definition store, applied to each of the plurality of images depending on the types of displays comprised in each of the dashboard objects from among a BI report, a text document, a list, a chart, and a graph, wherein the theme comprises one or more styles and one or more color schemes applied to each of the plurality of images.

3. The method of claim 1, wherein the metadata comprise respective names of the respective dashboard objects, and the method further comprises generating the respective images with respective colors based on the respective names.

4. The method of claim 1, wherein the metadata comprise respective names of the respective dashboard objects, and the method further comprises generating the respective images with respective horizontal lines each with a respective length that is based on the length of the respective name.

5. The method of claim 1, wherein the respective images are further based at least in part on data comprised within a respective dashboard objects.

6. The method of claim 5, wherein the data comprised within the respective dashboard object is stored by a server from a previous run of the respective dashboard object.

7. The method of claim 5, wherein the data comprises a number of pages in the respective dashboard object, and the method further comprises generating the image with a visual representation of the number of pages.

8. The method of claim 5, wherein the data comprises a data size of a display in the respective dashboard object, and the method further comprises generating the image with a visual representation of the display with a visual indication of the data size of the display.

9. The method of claim 8, wherein the data size of a display comprises at least one of a range of rows in a list and a size of a crosstab in the dashboard object.

10. The method of claim 1, wherein the icons are flexibly positioned to magnify differences in appearance between the respective images compared with the respective dashboard objects.

11. A computing system comprising:
one or more processors;
one or more computer-readable data storage devices; and
computer-executable program instructions, stored on the one or more computer-readable data storage devices for execution by the one or more processors, wherein the program instructions comprise:
program instructions for receiving business intelligence (BI) dashboard metadata for a plurality of dashboard objects, wherein respective dashboard objects among the dashboard objects are based on respective multidimensional data sources, wherein the metadata for each respective dashboard object indicates a number of dimensions of the respective multidimensional data source, a number of measures of the respective multidimensional data source, a number of tabs of the respective multidimensional data source, and types of displays comprised in the respective dashboard object; and
program instructions for generating, based on the BI dashboard metadata for the plurality of dashboard objects, a plurality of images in a business intelligence dashboard, wherein respective images among the plurality of images represent respective dashboard objects among the plurality of dashboard objects,
wherein generating the respective images is based at least in part on one or more rules defined for generating the images with respective visual patterns to represent characteristics of the metadata associated with the respective dashboard objects represented by the respective images, and
wherein the program instructions for generating the respective images based at least in part on the one or more rules comprise program instructions for generating the respective images with a plurality of generally vertical lines to represent the number of dimensions of the respective multidimensional data sources; a plurality of generally horizontal lines to represent the number of measures of the respective multidimensional data sources; a plurality of cascading horizontal lines to represent a number of tabs of the respective multidimensional data sources; and one or more icons representing the types of displays, wherein the icons comprise at least one of a crosstab icon, a chart icon, and a graph icon.

12. The computing system of claim 11, wherein the program instructions further comprise:
program instructions for receiving themes from a theme definition store; and
program instructions for generating the respective images with a different theme, from among the themes from the theme definition store, applied to each of the plurality of images depending on the types of displays comprised in each of the dashboard objects from among a BI report, a text document, a list, a chart, and a graph, wherein the theme comprises one or more styles and one or more color schemes applied to each of the plurality of images.

13. The computing system of claim 11, wherein the respective images are further based at least in part on data from a previous run of the respective dashboard objects stored by a server as metadata associated with the respective dashboard objects, wherein the program instructions further comprise:
program instructions for generating the image with a visual representation of the data from the previous run of the respective dashboard objects.

14. A computer program product comprising executable instructions stored on a non-transitory computer-readable storage medium, configured for causing one or more programmable processors to:
receive business intelligence (BI) dashboard metadata for a plurality of dashboard objects, wherein respective dashboard objects among the dashboard objects are based on respective multidimensional data sources, wherein the metadata for each respective dashboard object indicates a number of dimensions of the respective multidimensional data source, a number of measures of the respective multidimensional data source, a number of tabs of the respective multidimensional data source, and types of displays comprised in the respective dashboard object; and generate, based on the BI dashboard metadata for the plurality of dashboard objects, a plurality of images in a business intelligence dashboard, wherein respective images among the plurality of images represent respective dashboard objects among the plurality of dashboard objects, wherein generating the respective images is based at least in part on one or more rules defined for generating the images with respective visual patterns to represent characteristics of the metadata associated with the respective dashboard objects represented by the respective images, and wherein the program instructions for generating the respective images based at least in part on the one or more rules comprise program instructions for generating the respective images with a plurality of generally vertical lines to represent the number of dimensions of the respective multidimensional data sources; a plurality of generally horizontal lines to represent the number of measures of the respective multidimensional data sources; a plurality of cascading horizontal lines to represent a number of tabs of the respective multidimensional data sources; and one or more icons representing the types of displays, wherein the icons comprise at least one of a crosstab icon, a chart icon, and a graph icon.

15. The computer program product of claim 14, further comprising:

program instructions for receiving themes from a theme definition store; and program instructions for generating the respective images with a different theme, from among the themes from the theme definition store, applied to each of the plurality of images depending on the types of displays comprised in each of the dashboard objects from among a BI report, a text document, a list, a chart, and a graph, wherein the theme comprises one or more styles and one or more color schemes applied to each of the plurality of images.

16. The computer program product of claim 14, wherein the respective images are further based at least in part on data from a previous run of the respective dashboard objects stored by a server as metadata associated with the respective dashboard objects, the computer program product further comprising:

program instructions for generating the image with a visual representation of the data from the previous run of the respective dashboard objects.

* * * * *